United States Patent [19]
Frias et al.

[11] Patent Number: 5,538,346
[45] Date of Patent: Jul. 23, 1996

[54] NOVEL BALL TRANSFER UNIT

[75] Inventors: Samuel D. Frias, Lake Forest; Patrick W. Wells, Fountain Valley, both of Calif.

[73] Assignee: The Young Engineers, Inc., Laguna Hills, Calif.

[21] Appl. No.: 482,299

[22] Filed: Jun. 7, 1995

[51] Int. Cl.⁶ .......................... F16C 29/04; B65G 13/00
[52] U.S. Cl. ........................................ 384/49; 193/35 MD
[58] Field of Search ........................ 384/49; 193/35 MD

[56] References Cited

U.S. PATENT DOCUMENTS

| | | | |
|---|---|---|---|
| 3,559,802 | 2/1971 | Eidus | 193/35 MD |
| 3,739,894 | 6/1973 | Hinman | 193/35 MD |
| 3,920,290 | 11/1975 | Evarts | 193/35 MD X |
| 4,382,637 | 5/1983 | Blackburn et al. | 384/49 |
| 4,553,795 | 11/1985 | Takagi | 384/49 |
| 4,660,994 | 4/1987 | Masciarelli | 384/49 |
| 5,033,601 | 7/1991 | Huber | 193/35 MD |
| 5,096,308 | 3/1992 | Sundseth | 384/49 |

FOREIGN PATENT DOCUMENTS

| | | | |
|---|---|---|---|
| 824621 | 12/1951 | Germany | 384/49 |
| 0000940 | 11/1979 | WIPO | 193/35 MD |

*Primary Examiner*—Thomas R. Hannon
*Attorney, Agent, or Firm*—Joseph E. Mueth

[57] ABSTRACT

A ball transfer unit adapted to receive cargo for movement thereover having a ball race assembly including a cup member having a cylindrical wall extending therearound and having a terminal end at the outer extremity of said cup. The wall in proximity to said terminal end is provided with external threads. A plurality of roller balls repose in the cup. A rotatable cargo engageable ball rests on the roller balls. A ball cover is provided to prevent inadvertent removal of the cargo engaging ball from said assembly while allowing free rotation thereof. The ball cover has a terminal end and, in proximity to said terminal end, the cover is provided with internal threads. The external and internal threads are engageable to hold the ball cover in place on the ball race assembly during normal use and the ball cover being readily disengageable to permit disassembly and cleaning of the components of the unit. The unit has a flat, planar bottom surface on which to rest during disassembly. The cup is supported around its periphery by an inwardly extending shoulder provided on the cylindrical wall. The cup supported by the shoulder together with the threads serve to improve the alignment of the ball and ball cover so that less dirt is admitted.

9 Claims, 4 Drawing Sheets

NOVEL BALL TRANSFER UNIT

BACKGROUND OF THE INVENTION

There are in the prior art cargo handling systems where the support surface for the cargo has a plurality of ball transfer units positioned across the floor.

Ball transfer units for conveyor systems are known in which a load-bearing ball is seated in an essentially radially symmetric bearing unit having ball bearings in a bearing shell. The ball member of each unit is rotatably mounted in a manner to provide a low friction support surface over which the cargo can roll. In some instances, the ball members are spring loaded so as to provide for limited up and down movement of the ball members, so that the loads can be properly distributed over a number of ball transfer units.

Ball transfer units of this sort are used in conveyor systems, many identical ball units being mounted in ball platforms or beds to form a field over which objects to be transported, such as containers, can be pushed. Such ball units are commonly employed in cargo aircraft, where low weight and high reliability are important considerations.

Such cargo handling systems have been used in connection with aircraft where fast and convenient cargo handling is required, and the cargo handling must be accomplished in a relatively limited space. While such cargo handling systems in the past have been used effectively, there is a continuing need to improve the design of these systems relative to convenience of servicing and repair, and overall effectiveness of operation.

There are a number of such ball transfer units which are shown in the patent literature, and these are discussed below.

Karmin, WO 79/00940 discloses a ball handling device comprised of a body inside which is located a funnel-shaped support at the opening of which a ball is arranged. A threaded cover provided with a flange is intended to retain the ball when a pressure fluid flows into the support. When the threaded cover is removed, the entire unit is broken down into components which does not lend itself to the orderly disassembly which is important where large numbers of small roller balls are present.

Sundseth, U.S. Pat. No. 5,098,308 relates to a load bearing ball held in the bearing unit by a securing apparatus. The bearing unit has a supporting structure that enables the bearing unit to be fixed in an opening of a carrier plate in such a way that it can support a load. Detents are provided to lock the unit in the opening against the load direction. The bearing shell can be constructed integrally with the supporting structure as a semielastic formed element. This arrangement does not lend itself of ready removal of the ball transfer unit as a discrete unit from the supporting structure for cleaning or servicing.

Huber, U.S. Pat. No. 5,033,601 discloses a conveyor ball unit in which locking elements on the ball cover or guide perform a dual function: on the one hand, locking shoulders are present which serve to hold the mounting shell, the roller balls, the conveyor ball and the ball cover together, while on the other hand they also perform the function of holding the conveyor ball transfer unit in the mounting opening in the conveyor bed or platform. In the installed condition, the locking shoulders also engage under the edge of the mounting opening in the conveyor bed to secure the conveyor ball transfer unit in position. This structure does not lend itself to the removal of the ball transfer unit from the bed in one piece for servicing and cleaning.

Hinman, U.S. Pat. No. 3,739,894, shows a ball transfer unit where the main ball is supported by a plurality of smaller ball bearings. The cover member has an upper in turned shoulder which engages a flange in the ball race assembly to hold the main cargo engaging ball in place. There is a compression spring which urges the ball upwardly toward its upper support position. This type of securing arrangement for holding the ball cover to bearing race assembly is not easily undone for servicing.

Gorges, U.S. Pat. No. 4,696,583, discloses a ball transfer unit having an upper ball retaining portion in the form of a generally cylindrical side wall that defines a ball receiving recess. The upper half of the wall is formed with four evenly spaced vertical slots that separate the upper portion of the side wall into four expandable sections. The upper edge of the side wall is formed with a circumferential flange that has an inwardly extending circumferential lip to retain the ball in the recess. The outer edge of the flange fits against the upper inner surface of a surrounding collar which, in turn, is held in the conveyor bed by a retaining spring. This device is quite complicated to take apart and re-assemble.

Evarts, U.S. Pat. No. 3,920,290 discloses a ball transfer unit comprising a ball, a housing, means for rotatably supporting the ball within the housing and means for retaining the ball on the support means and within the housing. No provision is made for disassembly for servicing.

SUMMARY OF THE INVENTION

Briefly, this invention comprises a ball transfer unit adapted to receive cargo for movement thereover having:

a ball race assembly including a cup member having a cylindrical wall extending therearound and having a terminal end at the outer extremity of said cup, the wall in proximity to said terminal end is provided with external threads;

a plurality of roller balls repose in the cup;

a rotatable cargo engageable ball rests on the roller balls; and a ball cover is provided to prevent inadvertent removal of the cargo engaging ball from said assembly while allowing free rotation thereof, the ball cover has a terminal end and, in proximity to said terminal end, the cover is provided with internal threads, the external and internal threads are engageable to hold the ball cover in place on the ball race assembly during normal use and the ball cover being readily disengageable to permit disassembly and cleaning of the components of the unit.

It is an object of this invention to provide a novel ball transfer unit.

It is a particular object of this invention to provide a novel ball transfer unit which is easy to disassemble for cleaning and, if necessary, to repair, and then reassemble.

These and other objects and advantages of this invention will be apparent from the detailed description which follows.

The device of the present invention is adapted to be popped out of a conveyor bed. The device is then ready for easy disassembly for repair and cleaning. This provides a significant advantage in the art since ball transfer units receive hard use and abuse and require servicing.

It will be noted that the unit can be placed on a flat surface and the ball cover unscrewed, facilitating removal of all of the internal components for inspection, cleaning and any necessary replacement.

DESCRIPTION OF PREFERRED EMBODIMENT

Turning to the drawings.

Figure 1:
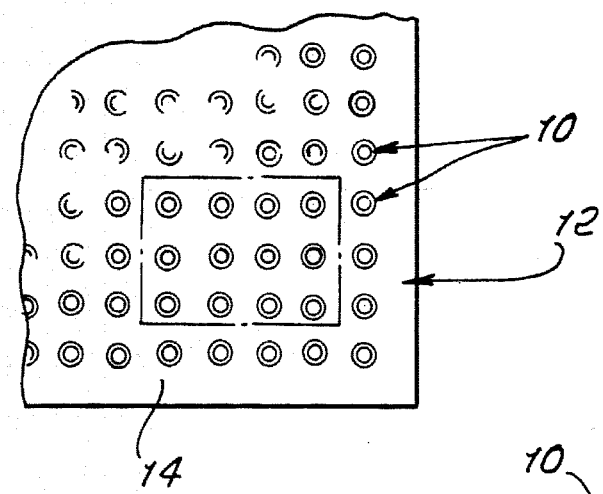
FIG. 1 is a top view of a bed or platform containing spaced apart rows of the ball transfer units of this invention.
Figure 2:
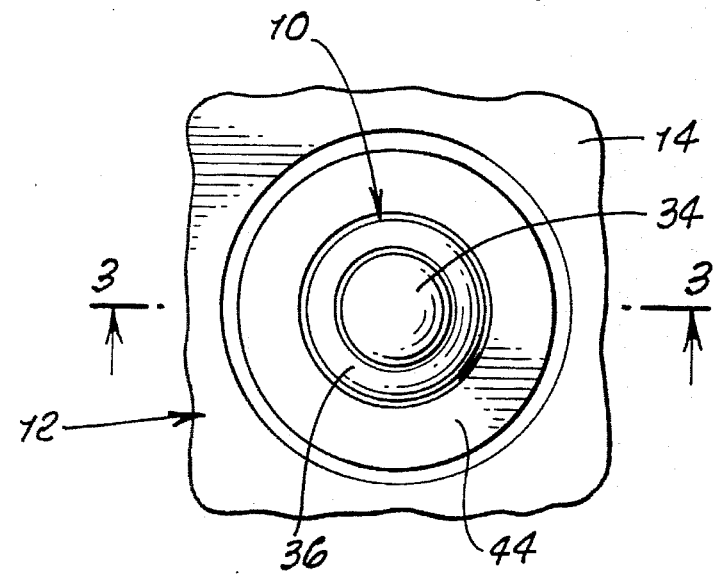
FIG. 2 is an enlarged top view of one of the ball transfer units of FIG. 1.
Figure 3:
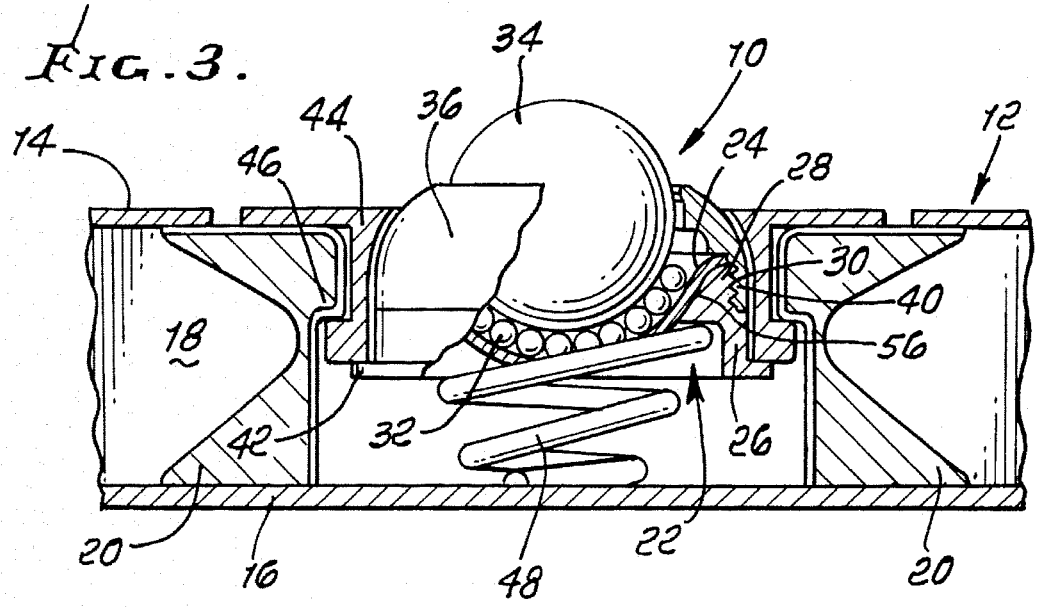
FIG. 3 is a partial sectional view taken along the line 3—3 in FIG. 2.
Figure 4:
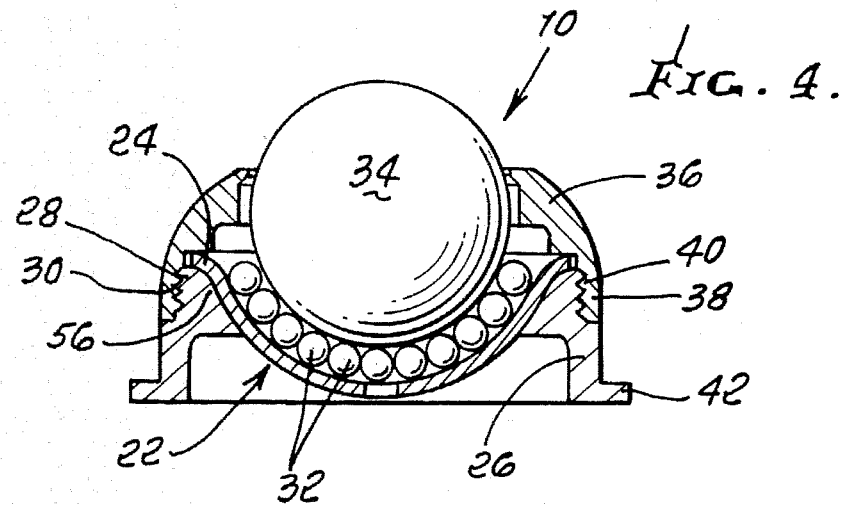
FIG. 4 is a sectional view of the ball transfer unit of FIG. 3 isolated from the bed.
Figure 5:
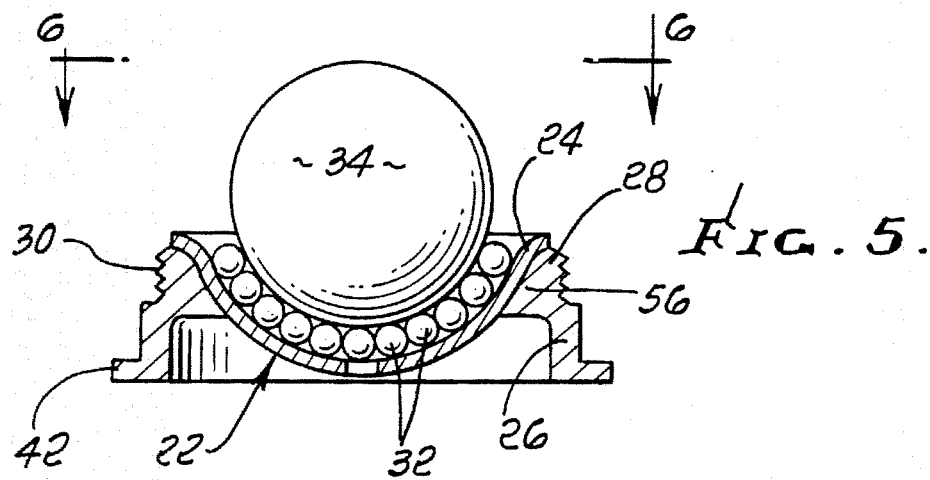
FIG. 5 is similar to FIG. 4 showing the ball cover removed.
Figure 6:
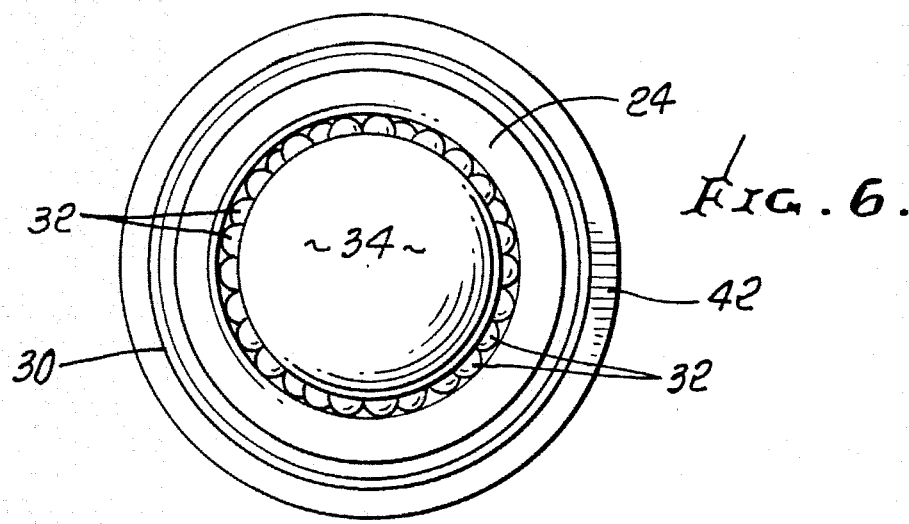
FIG. 6 is a top plan view of the structure shown in FIG. 5.

Considering the drawings in more detail, the ball transfer units, generally 10, are adapted to be carried in a bed 12. The bed 12 itself forms no part of this invention.

Typically the bed 12 has an upper skin 14 and a lower skin 16, each of a thin material, in aircraft, usually aluminum. Between the skins is usually some type of honeycomb fill 18. The ball transfer units 10 are positioned within the bed 12 with a pair of spaced apart ribs 20 forming part of the bed and providing an area into which the ball transfer units are seated. The upper skin 14 is annularly cut to form an opening for receiving a ball transfer unit.

The ball transfer unit 10 has a ball race assembly 22 including a cup member 24 having a cylindrical wall 26 extending therearound and having a terminal end 28 at the outer extremity of the cup member 24, said wall 26 in proximity to said terminal end being provided with external male threads 30.

The cup member 24 is usually a separate piece and can be dropped into place for assembly.

A plurality of roller balls 32 repose within the cup member 24.

A rotatable cargo engageable ball 34 rests on the roller balls 32.

A ball cover 36 prevents the inadvertent removal of the cargo engaging ball 34 from the ball race assembly 22 while allowing rotation thereof. The ball cover 36 has a terminal end 38. In proximity to terminal end 38, internal female threads 40 are provided. Male threads 30 are engageable with female threads 40 to hold the cargo engageable ball 34 and ball cover 36 in place during normal use.

The ball race assembly 22 has at its lower extremity an annular laterally projecting flange 42 which is adapted to engage the lower surface of the retainer ring 44. The retainer ring 44, in turn, engages undercuts 46 in the spaced apart ribs 20. The lower surface of the retainer ring 44 is provided with annular cutouts (not shown) such that when the ball unit 10 is pressed down and the ring 44 rotated about 45 to 60 degrees, the ball unit 10 pops out of bed 12 under the influence of load spring 48, and can be removed for servicing.

The load spring at one end rests on lower skin 16 and at its upper or opposite end is received in a recess formed between the bottom of cup member 24 and the inside surface of cylindrical wall 26.

It is to be understood that the bed and the manner in which the ball unit can be retained can be greatly varied. For example, the ball transfer units can simply be bolted to a door sill or to a steel plate provided with a plurality of holes for receiving ball transfer units in which case no load springs are used.

The ball transfer units are used on aircraft and also on ground based cargo handling equipment.

Figure 7:
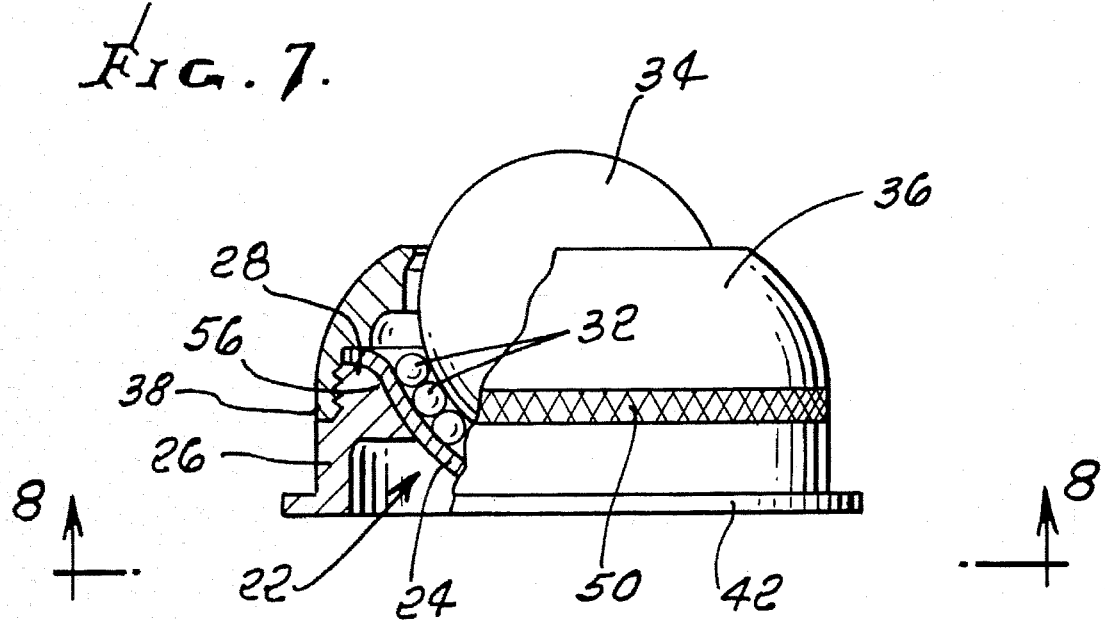
FIG. 7 is a side view in partial section of one preferred embodiment having a knurled ball cover and gripping cutoffs on the lateral flange on the ball race assembly to facilitate gripping for assembly and disassembly.
Figure 8:
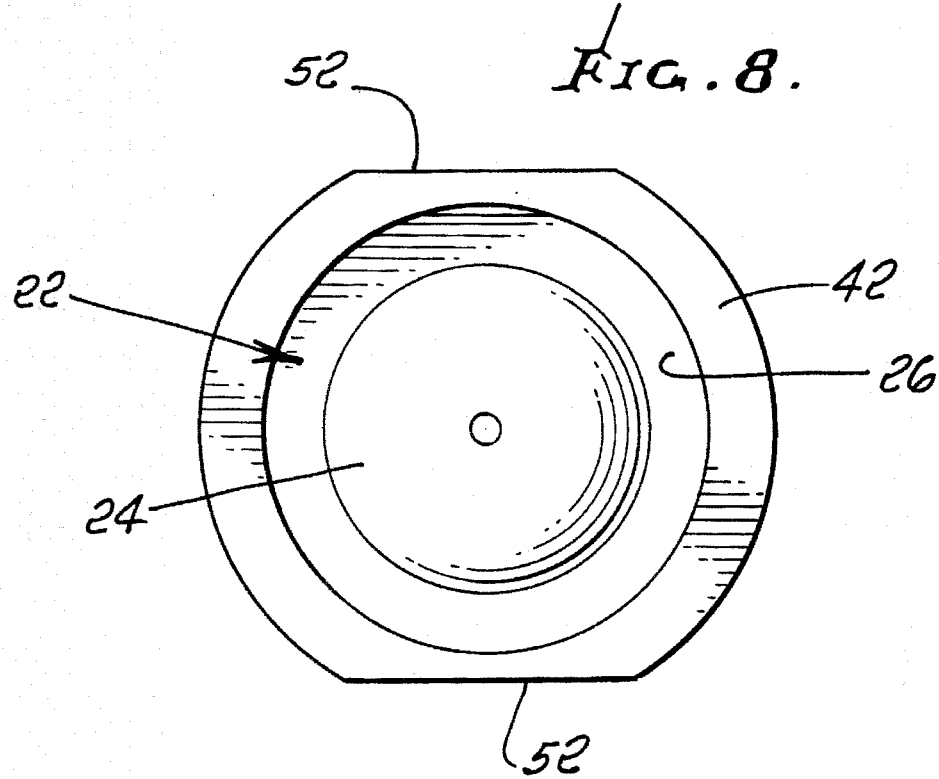
FIG. 8 is a bottom plan view along line 8—8 in FIG. 7.

Considering FIGS. 7 and 8, which is one embodiment of the invention, the ball cover 36 is provided with external knurling 50 extending around its periphery. The flange 42 of the ball race assembly 22 has diametrically opposed flats or cutoffs 52. The ball race assembly can be held by a tool such as a wrench at the cutoffs 52 and the ball cover 36 turned by digitally gripping the knurling 50. This facilitates disassembly of the ball unit after it has been subjected to extended use and exposed to the effects of dirt and weather. The threads may have become slightly damaged, requiring use of considerable force to threadably disengage the ball cover 36 from the ball race assembly 22 for cleaning and servicing of the components.

Servicing may include replacement of parts and/or the washing of the parts to remove accumulated grit.

Figure 9:
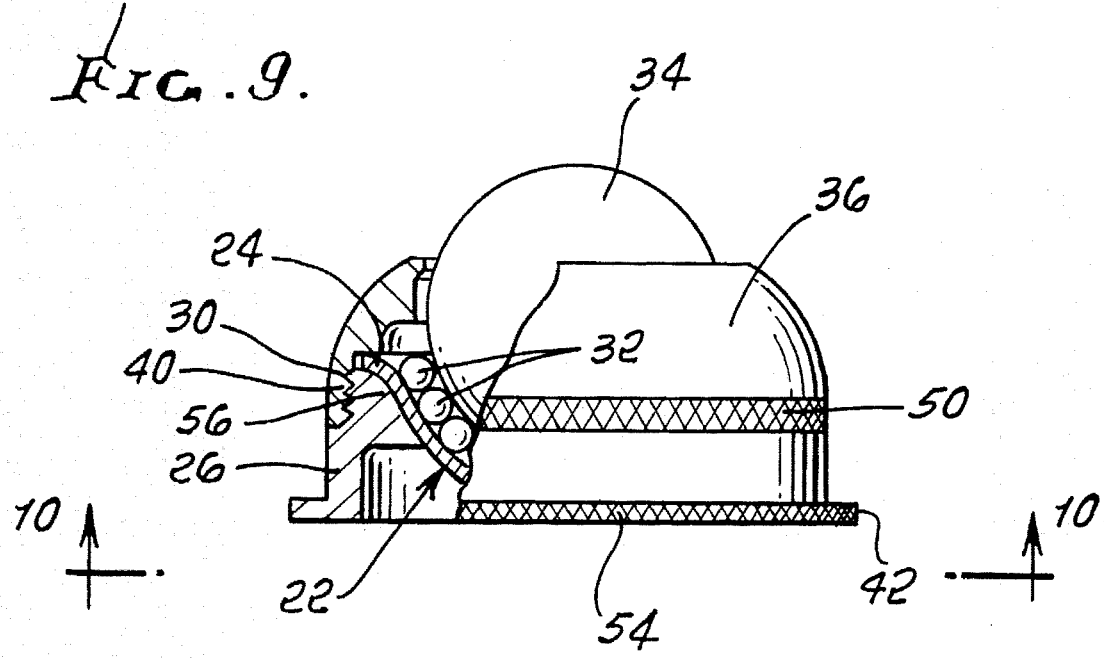
FIG. 9 is another embodiment where both the ball cover and the lateral flange on the ball race assembly are knurled to facilitate gripping.
Figure 10:
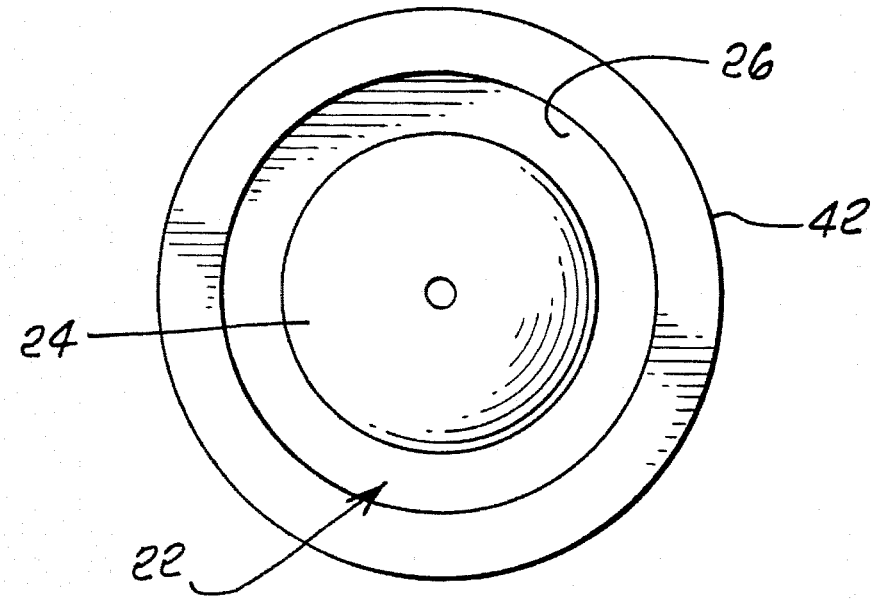
FIG. 10 is a bottom plan view taken along the line 10—10 in FIG. 9.

The embodiment of FIGS. 9 and 10 relies on the presence of knurling 50 on the ball cover 36 and knurling 54 on flange 42 of the ball race assembly 22. The knurled surfaces are complementary, and by gripping with the application of counter rotational force, the parts can be separated for servicing.

Yet another important feature of this invention is that cup member 24 is supported around the underside of its periphery by the annular shoulder 56 which abuts the cup member. Shoulder 56 is formed integrally with and intends inwardly from cylindrical wall 26.

The cup member 24 floats on shoulder 56 because the two elements have the same radius, which results in the self-alignment and centering of the cup member within the unit.

The superior alignment of the parts provided by this invention allows for a closer tolerance to be held between the cargo engaging ball 34 and the ball cover 36. The reduced clearance between ball 34 and ball cover 36 serves to reduce the amount of dirt and debris which is admitted into the interior of the ball transfer unit which, in turn, reduces wear and tear.

This extensive support of the cup increases the vertical load bearing capacity of the ball transfer unit and represents a considerable structural improvement over prior designs which employ a plurality of separate rings which are subject to misalignment and are prone to failure.

Having fully described the invention, it is intended to by limited solely by the appended claims.

We claim:

1. A ball transfer unit adapted to receive cargo for movement thereover having:

a ball race assembly including a cylindrical wall, a cup member, said cylindrical wall extending around and supporting said cup member, said cylindrical wall having a terminal end at the outer extremity of said cup, the wall in proximity to said terminal end being provided with external threads;

a plurality of roller balls repose in the cup;

a rotatable cargo engageable ball rests on the roller balls; and a ball cover is provided to prevent inadvertent removal of the cargo engaging ball from said assembly while allowing free rotation thereof, the ball cover has a terminal end and, in proximity to said terminal end, the cover is provided with internal threads, the external and internal threads are engageable to hold the ball cover in place on the ball race assembly during normal use and the ball cover being readily disengageable to permit disassembly and cleaning of the components of the unit.

2. The ball transfer unit of claim 1 wherein said ball race assembly at its lower extremity has an annular laterally projecting flange.

3. The ball unit of claim 2 wherein said flange has diametrically opposed cutoffs and said ball cover is provided with external knurling extending around its periphery such that by tool gripping of the flange and digital gripping of the knurling, the ball cover can be removed from the ball race assembly for servicing and cleaning of the unit.

4. The ball unit of claim 2 wherein said flange has external knurling and said ball cover is provided with external knurling around its periphery such that by digital gripping of the respective knurled surfaces the ball cover can be removed from the ball race assembly for servicing and cleaning of the unit.

5. The ball unit of claim 1 having a flat bottom surface on which the unit can rest during assembly and disassembly.

6. The ball unit of claim 1 wherein the cargo engageable ball and the ball cover are kept in narrow clearance by said threads to limit the entry of dirt into the unit.

7. The ball unit of claim 1 wherein the cup member is supported around the underside of its periphery by an annular shoulder which extends inwardly from said cylindrical wall.

8. The ball unit of claim 1 wherein a recess is formed between the underside of the cup member and the inside surface of said cylindrical wall, said recess being adapted to receive a load spring.

9. The ball unit of claim 1 wherein said cylindrical wall includes an annular shoulder and said cup member has an underside supported around its periphery by said annular shoulder, said annular shoulder and the underside of said cup member having the same radius, wherein said cup member floats on said annular shoulder and said cup member is aligned and centered within said ball unit.

* * * * *